Oct. 15, 1968  W. O. BROWN  3,405,411
ARM AND SEAT ASSEMBLY
Filed Sept. 1, 1966  5 Sheets-Sheet 1
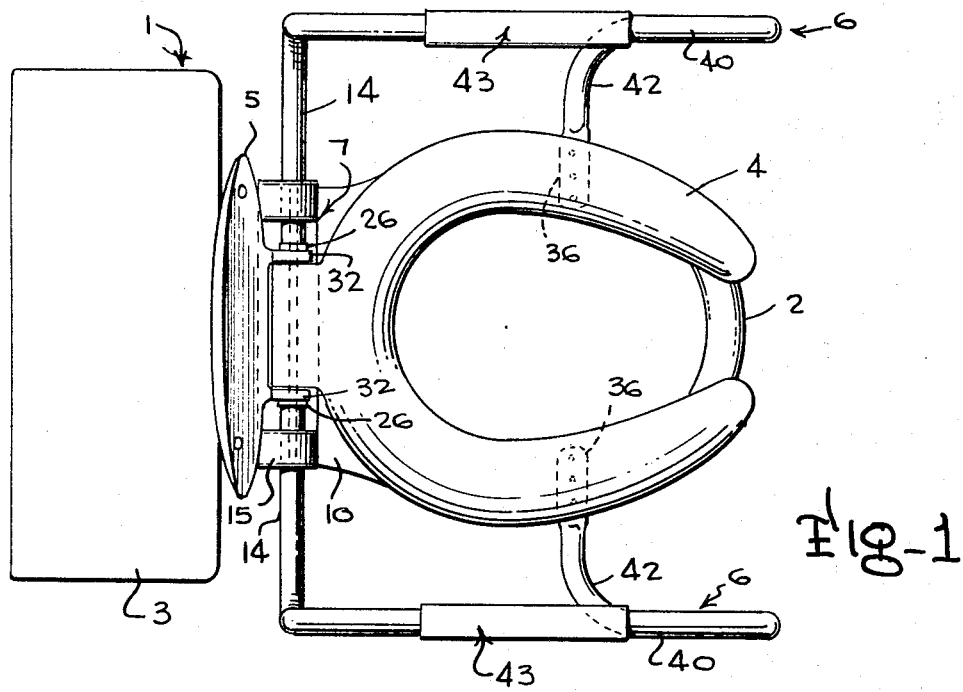
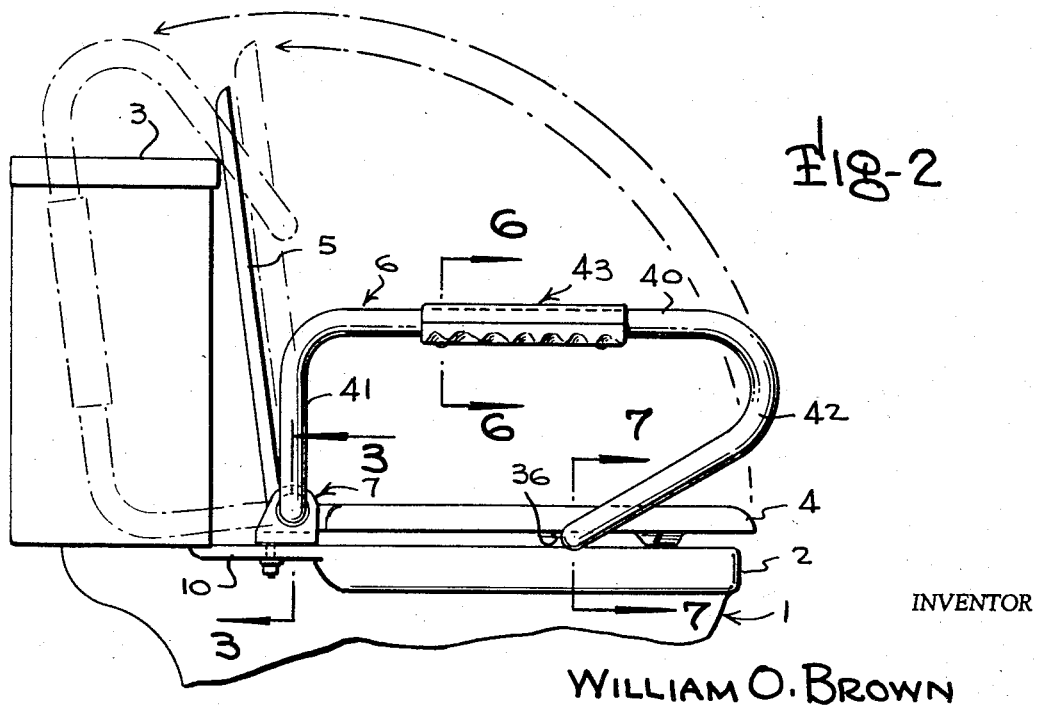
INVENTOR
WILLIAM O. BROWN
BY Mason, Fenwick & Lawrence
ATTORNEYS Oct. 15, 1968  W. O. BROWN  3,405,411
ARM AND SEAT ASSEMBLY
Filed Sept. 1, 1966  5 Sheets-Sheet 2
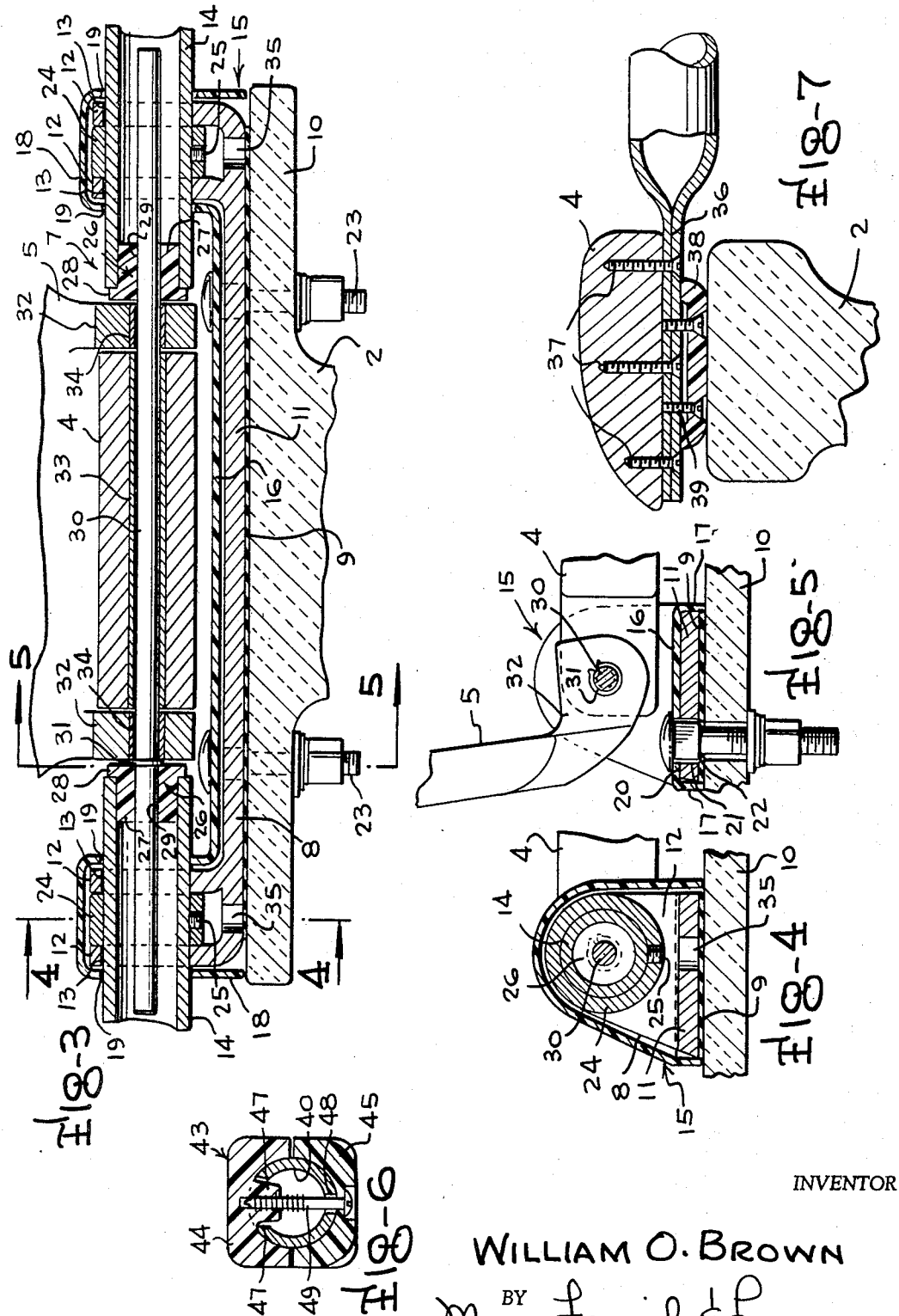
INVENTOR
WILLIAM O. BROWN
BY Mason, Fenwick & Lawrence
ATTORNEYS

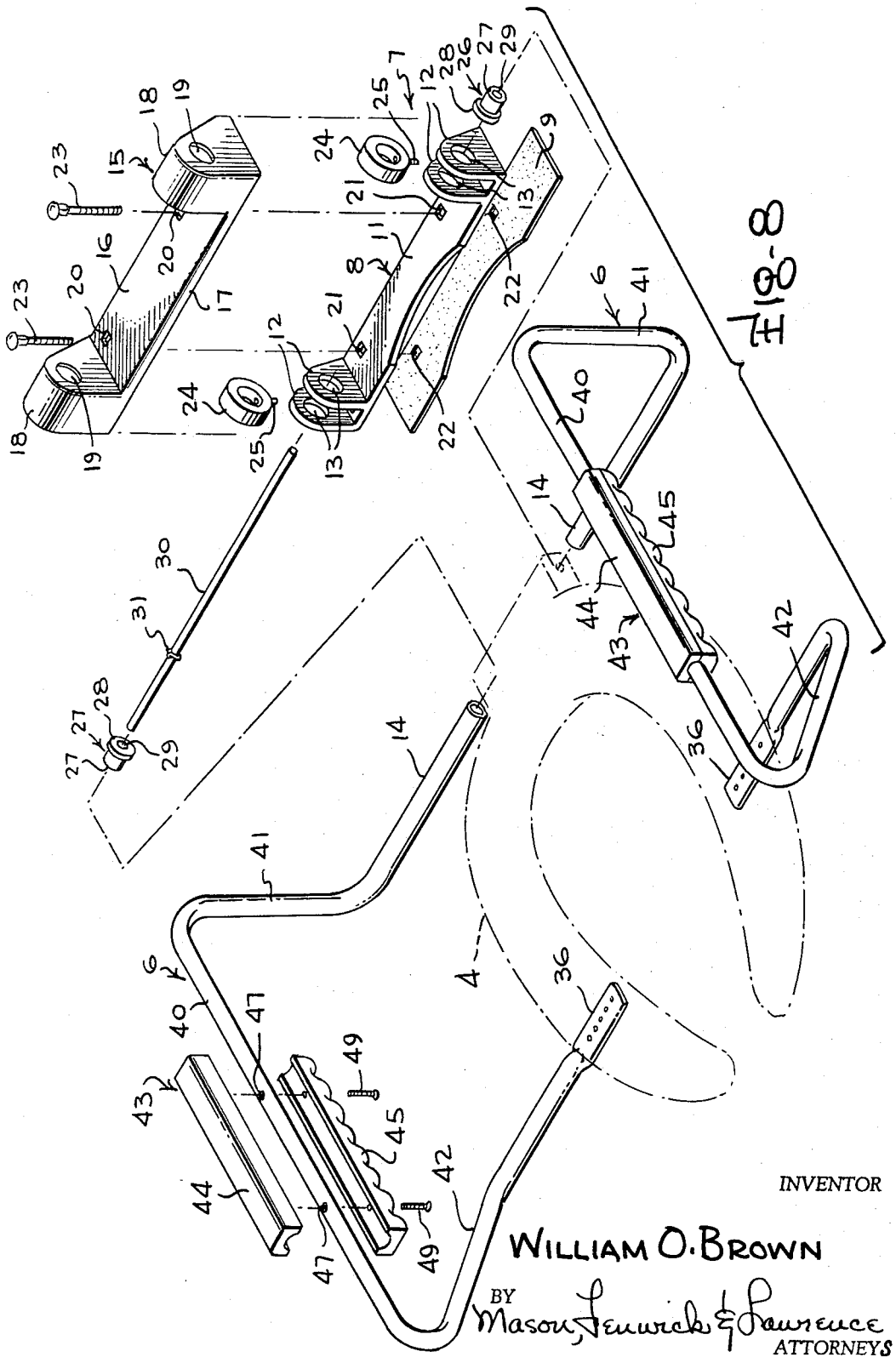

Oct. 15, 1968 W. O. BROWN 3,405,411
ARM AND SEAT ASSEMBLY
Filed Sept. 1, 1966 5 Sheets-Sheet 4

INVENTOR
WILLIAM O. BROWN
BY Mason, Fenwick & Lawrence
ATTORNEYS

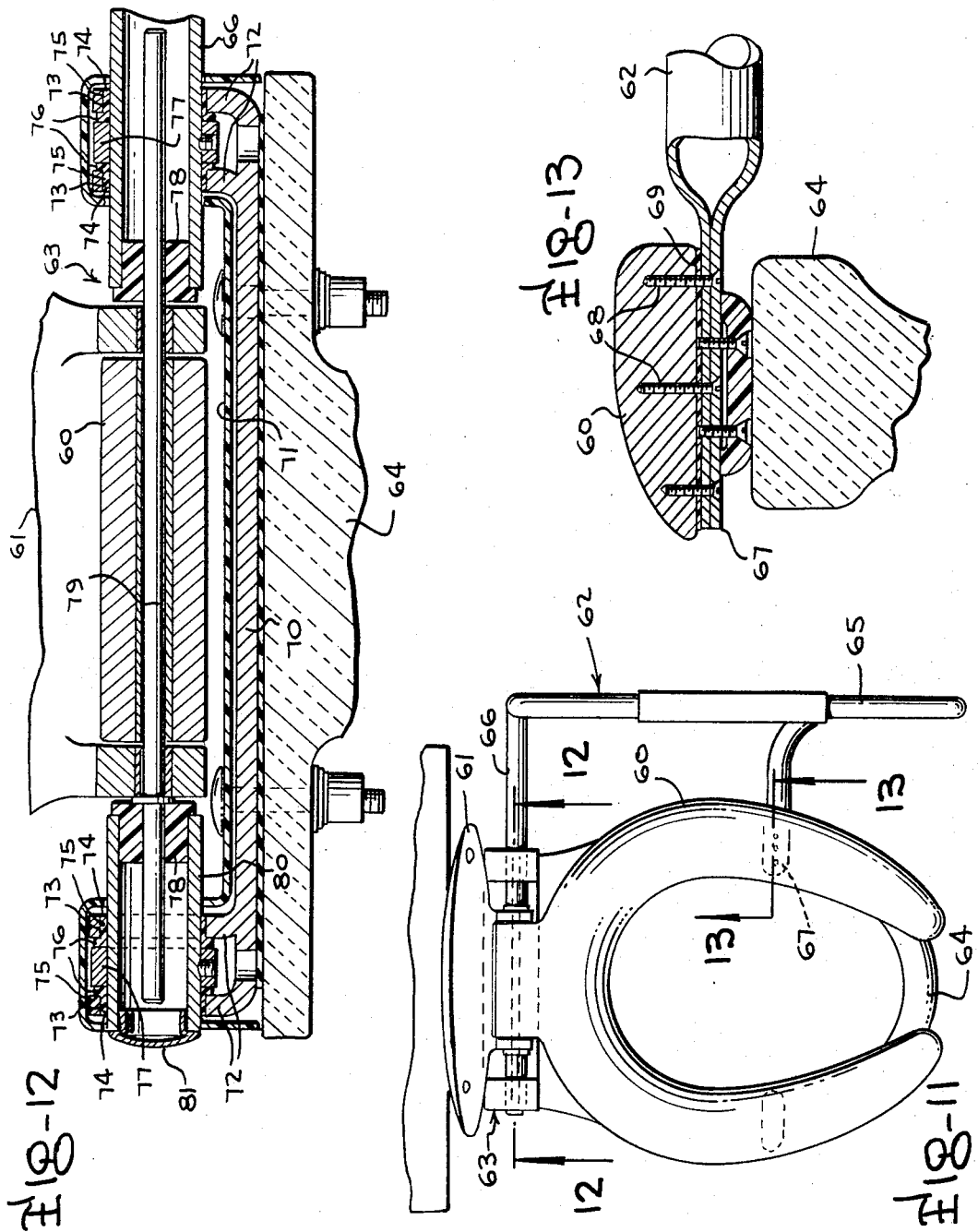

United States Patent Office 3,405,411
Patented Oct. 15, 1968

3,405,411
ARM AND SEAT ASSEMBLY
William O. Brown, Columbus, Miss., assignor to Beneke Corporation, Columbus, Miss., a corporation of Mississippi
Filed Sept. 1, 1966, Ser. No. 576,603
12 Claims. (Cl. 4—254)

ABSTRACT OF THE DISCLOSURE

A closet seat having one or two arms mounted for pivotal movement with the seat. The arms have front ends attached to the seat, and rear ends inturned into axial alignment with one another and mounted in spaced bearings on the closet bowl. The seat is mounted on a pivot rod axially aligned with the rear ends of the arms, with the rod ends carried within the aligned arm ends. The seat and arms can be mounted on supports other than closet bowls. Where there is no flush box, the arms carry stops to limit seat cover movement.

---

This invention relates to water closet seats having one or more arms, and more particularly to such seats for use by paralytic, infirm, obese, post-operative and other physically handicapped persons.

Water closets are constructed in accordance with certain standards. For example, the height is set at a predetermined level, chosen as a result of tests over many years to provide the proper posture for persons using the water closet. Although this level is comparatively low, persons in normal physical condition experience no difficulty in sitting upon or rising from the seat. The physically handicapped, however, have considerable difficulty, due to weakness, in lowering themselves to the seat or rising from it. In fact, some persons are in such weakened condition that they need support to remain upright while seated. In many instances the physically handicapped require the lifting power of their arms as well as their legs to lower themselves to a seated position or to rise from a seated position.

The general object of the present invention is to provide a water closet seat having at least one arm, which is extremely rigid to provide adequate support to those who need it, and which will permit handicapped persons to care for their own needs without help.

A more specific object of the invention is to provide an armed seat for use by the handicapped, wherein the additional structure will in no way affect the normal use of the seat or water closet.

Another object of the invention is to provide a seat of this nature which can be raised in conventional manner to permit use of the water closet as a urinal, whether the water closet be of the tank type, flush valve type, or wall hung type.

A further object is the provision of a water closet armed seat, wherein the principal connection of the arm or arms, is through the seat hinge support to eliminate strain on the seat.

Yet another object of the invention is to provide a seat of this kind which will afford maximum sanitation and ease of cleaning.

A still further object is to provide such a seat which needs no special mounting or fixtures.

It is also an object to provide such a seat for use with other than tank type water closets, having means to support the seat and cover when raised.

Other objects of the invention will become apparent from the following description of practical embodiments thereof, when taken in conjunction with the drawings which accompany, and form part of, this specification.

In the drawings:

FIGURE 1 is a top plan view of a seat embodying the principles of the present invention, shown mounted on a water closet of the tank type;

FIGURE 2 is a side elevation of the structure shown in FIGURE 1, illustrating the seat in full lines in lowered position and in dotted lines in raised position;

FIGURE 3 is an enlarged vertical section through the hinge and its support, and is taken on the line 3—3 of FIGURE 2;

FIGURE 4 is a vertical transverse section taken on the line 4—4 of FIGURE 3;

FIGURE 5 is a vertical transverse section, taken on the line 5—5 of FIGURE 3, showing the mounting studs;

FIGURE 6 is an enlarged section taken through one of the arms substantially on the line 6—6 of FIGURE 2;

FIGURE 7 is an enlarged vertical section taken on the line 7—7 of FIGURE 2, showing the attachment of one arm to the seat;

FIGURE 8 is an exploded perspective view of the arm structures and the mounting means for attaching the arms and seat to a water closet;

FIGURE 11 is a top plan view of still another modified form of the invention, the seat being shown in lowered position and the cover raised;

FIGURE 12 is an enlarged vertical section view through the hinge, taken on the line 12—12 of FIGURE 11; and FIGURE 13 is an enlarged vertical section through the seat at the point of connection of the arm, and is taken on the line 13—13 of FIGURE 11.

Figure 10:
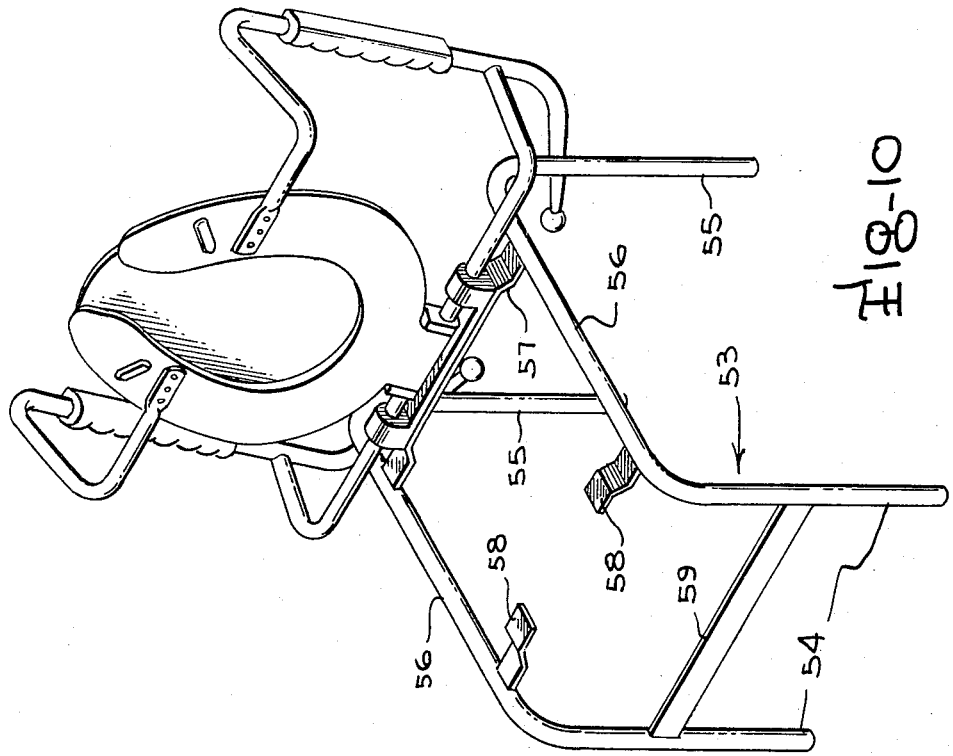
FIGURE 10 is a perspective view of the seat structure shown in FIGURE 9 attached to a stand for use in tubs and other places.

In general, the invention consists in a water closet seat having an arm at one side, or arms at either side, with the arm, or arms, being mounted so as not to interfere with the free hinging movement of the seat. The arm mounting is such that strains will be taken by fixed portions of the water closet, and there will be little strain upon the connections between arm and seat.

Referring to the drawings in detail, and first to that form of the invention illustrated in FIGURES 1 to 8, there is shown a conventional tank type water closet 1 having the usual bowl 2 and flush tank 3. A seat 4 and cover 5 are hingedly mounted on the bowl. Arms 6 are carried on each side of the seat.

The seat and cover are mounted upon the bowl by means of a hinge assembly 7, which also serves as the principal mounting member for the arms 6. The hinge is carried by a mounting plate 8, which seats upon a pad 9 when in place on the rear apron 10 of the bowl. Mounting plate 8 has a horizontal, flat base plate 11, with a pair of vertical, horizontally spaced, parallel ears 12 at each end. The vertical ears have coaxial apertures 13 to rotatably receive the tubular ends 14 of the arms 6, as will be described. There is a cover plate 15, which may be of plastic material, to overlie the mounting plate 8. The cover plate has a flat central section 16 with depending side flanges 17, to cover the base plate 11 of the mounting plate, and vertical housings 18 at the ends to receive the vertical ears 12 of the mouting plate. Housings 18 have openings 19 in their sides, which are in axial alignment with the apertures 13 in vertical ears 12 when the cover plate is in place on the mounting plate. The cover plate has squared openings 20, which are in alignment with similar openings 21 in the base plate and openings 22 in the pad 9, to receive mounting bolts 23 to secure the mounting plate and housing to the closet bowl.

When the tubular ends 14 of arms 6 are in position in the apertures 13 in the vertical ears of the base plate, the two tubular members are in axial alignment. Collars 24 are mounted on the tubular ends 14, between the ears 13, and each collar is provided with a set screw 25 for securing the collar to the tubular ends of the arms. When the set screws are fastened, the tubular ends of the arms will be held against movement in an axial direction, but free for rotative movement within the ear apertures. The ends of the tubular members are closed by bushings 26, each bushing being a cylindrical body 27 to fit within the end of the tubular member and an annular flange 28 at the outer end to abut the end of the tubular member to fix the position of the bushing with respect to the tubular member end. Each bushing has a central opening 29 which extends axially of the bushing. A hinge rod 30 has its ends mounted in the openings 29 in the bushings, and has the seat 4 and cover 5 pivotally mounted on it between the bushings 26. It will be noted from FIGURE 3 that the hinge rod has an encircling split ring 31 which rests between one of the bushings 26 and one side mounting ear of the cover 5, so as to prevent longitudinal movement of the hinge pin after the hinge is assembled.

In assembling the hinge, the collars 24 are first slipped into place between the pairs of ears 12 of the mounting plate 8. These collars are of sufficient thickness to have a snug fit between the ears, so that they may be positioned with their central openings aligned with the apertures 13 in the mounting plate ears. The cover plate 15 is then put in position over the base plate. Hinge rod 30 is then inserted through the aligned opening 33 in the seat 4 and openings 34 in the mounting ears 32 of the cover 5 and the bushings 26 are slipped onto the projecting ends of the hinge rod. The projecting ends of the hinge rod will then be placed through the openings in the mounting plate, which will be an easy operation due to the fact that the hinge rod can slide axially in one direction until its opposite end has cleared the ears at the far end of the mounting plate. With the parts so positioned, the hinge rod will be moved axially until the ring 31 is in abutment with the adjacent mounting ear 32 of the cover. The tubular ends 14 of the arms are then inserted through the apertures 13 in the vertical ears of the mounting plate and through the collars 24 which are between them. The tubular members are pushed inward until they are firmly seated on the cylindrical bodies of the bushings 26 and their ends are in abutment with the annular flanges 28 on the bushings. When both tubular members are properly seated, the assembly can be shifted relative to the mounting plate to center it with respect to the mounting plate. The set screws 25 in collars 24 will then be tightened by inserting the proper tools through access openings 35 in the base of the mounting plate. This will fix the entire assembly relative to the mounting plate, and the tubular arm ends and the hinge pin will be in coaxial relation.

The opposite ends of arms 6 are flattened to form attaching plates 36 for securing the arms to the seat 4 (see FIGS. 1, 7 and 8). These plates are fixed to the seat by means of screws 37. It is usually desirable to attach plastic bearing pads 38 to the undersides of the attaching plates 36 to rest upon the top of the closet bowl to transmit strains directly from the arms to the closet bowl and to prevent marring of the porcelain of the bowl. Pads 38 can be secured in place by screws 39 threaded into the attaching plates 36.

The shape, or contour, of the arms between the tubular ends 14 and the attaching plates 36 is not of great importance, so long as each contains a horizontal arm rest 40 which is located at a proper height above the seat 4, with the arm rests of the two arms being spaced apart a distance somewhat greater than the width of the flush tank 3 so that they may pass on either side of the tank when the seat and cover are in raised position. To this end, the entire arm can be formed from tubular stock, with the horizontal arm rest 40 being connected respectively with the tubular end 14 by means of a rear leg 41, and to the attaching plate 36 by means of a front leg portion 42. In order to insure a firm grip on the arm rests by the user, plastic grips 43 may be secured to them. These may take the form of upper and lower grip members 44 and 45, with the upper members having locating studs 46 for seating in openings 47 in the horizontal arm rests 40. The arm rests 40 will have bolt openings 48 directly below the locating stud openings 47 so that bolt 49 may pass through the lower grip members and be threaded into the locating studs 46 to secure the two grip members to each other and to the horizontal arm rest. If desired, the lower grip member may be contoured to provide finger recesses.

The above described construction will provide an armed water closet seat which is extremely rigid. In view of the fact that the arms form part of the hinge connection for the seat to the bowl, strains upon the arms will be transmitted to the rugged hinge assembly. Downward pressures upon the arms will be taken by the hinge assembly at the rear and, through the front leg portion 42, by the water closet bowl. Outward forces will be resisted by the relatively long bearing of the tubular member 14 in the hinge assembly. Thus, there will be little tendency to twist the arms and slight possibility that the screw connections between the attaching plates 36 and the seat will be pulled loose. The mounting affords free movement of the seat and cover in the manner of a conventional construction, so that the water closet may be used in the usual manner and by the handicapped and others.

Figure 9:
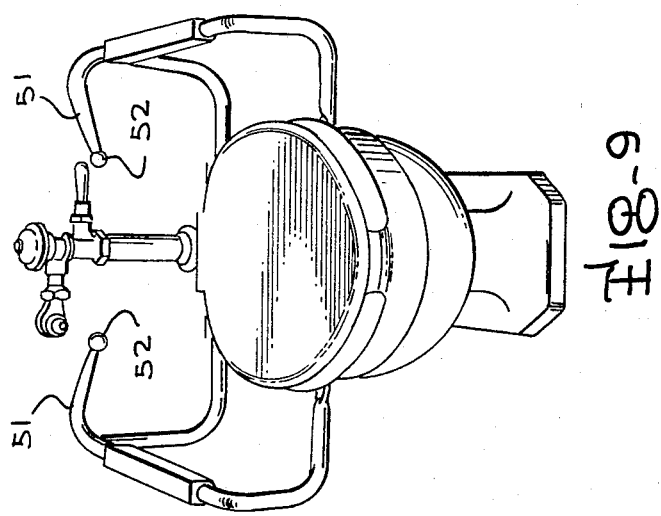
FIGURE 9 is a perspective view of a water closet seat and arms with means for supporting a seat cover and seat when in raised position.

Turning now to FIGURE 9, there is shown a modified arrangement, adapted for use where there is no flush tank, such as with the flush valve type water closet 50 as shown, or the well known wall-hung model. As the seat and arms are substantially identical to the form previously described the same reference characters have been used to designate the same parts.

The sole difference between that form of the invention shown in FIGURE 9 and the one previously described lies in the provision of cover supports 51, which project rearwardly and inwardly from the horizontal arm rests 40. These supports terminate in cover contacting members 52, which may be in the form of plastic, or resilient, material bumpers. The seat contacting members will be so located as to form supports for the cover when it is raised and at a slight rearward angle, to hold the seat and prevent its contact with the flush valve.

FIGURE 10 shows the same seat and arm construction as illustrated in FIGURE 9, but the seat is mounted upon a special support 53, rather than upon a water closet. This self-supporting model is designed for use in bathtubs, with receptor bases or built-up drains for geriatrics patients.

The support 53 comprises two sides members having front and rear legs, 54 and 55, connected at their upper ends by top rails 56. The two top rails are connected at their rear ends by a hinge mounting rail 57 upon which the hinge mounting plate 8 may be secured. Adjacent the front of the top rails there are inwardly extending perches 58 upon which the front portion of the seat may rest. Any other suitable bracing, such as the lower front brace 59, may be used as required.

With this last described form of the invention the cover and seat are free to move together, or independently, at the desire of the user. When the seat and cover are in lowered position, the entire unit may be used as a seat.

Turning now to that form of the invention shown in FIGURES 11, 12 and 13, there is shown a seat having an arm on one side only, and a hinge connection which is slightly different from the one previously described. There is also some modification in the attachment of the arm to the seat. In this form of the invention, the seat 60, cover 61, and a single arm 62 are all connected to the hinge assembly 63. The hinge assembly is attached to a water closet 64.

Arm 62 may be a duplicate of one of the arms in the previously described forms, and is provided with a horizontal arm rest portion 65, a tubular end 66 for mounting in the hinge assembly and a flattened end 67 for attachment to the seat. The attachment of the flattened end 67 to the seat is by means of screws 68 as before, but in this embodiment a flat gasket 69, which may be of a plastic such as polyethylene, is inserted between the flattened end of the arm and the seat to afford more complete sanitation in the connection.

The hinge assembly 63 consists of a mounting plate 70 and a cover plate 71. The mounting plate 70 has horizontally spaced, vertical ears 72 at its ends, which are apertured at 73, as in the previously described form. The hinge assembly differs from the previous form in having nylon bushings 74 inserted in the apertures 73. The bushings have body portions 75 which are cylindrical and fit within apertures 73, and outwardly extending flanges 76 which lie against the inner faces of the vertical ears and provide a bearing surface between the ears and collar 77 on the tubular end 66 of the arm. By use of the bushings, the tubular end of the arm and the collar will rotate freely within the apertures without binding. The end of the tubular member is closed by a bushing 78 which has a central opening to receive the hinge rod 79. Thus, the only difference in the mounting of the arm at this end of the assembly is the use of the bushings 74 in apertures 73 of the vertical ears of the mounting plate.

As there is but one arm in this embodiment, a length of tubing 80, of the same size and material as the tubular end 66 of the arm, is inserted in the bushings 74 in the apertures of the vertical arms at this side of the housing. The length of tubing carries a bushing 78 at its inner end, and has its outer end closed by a cap 81. This provides for a balanced mounting of the seat and arm, and permits use of standard mounting plates for either a one or two-arm seat. If but one arm is to be used it is only necessary to substitute the short length of tubing 80 for a tubular member of a second arm to complete the assembly and provide for the same action as in the previously described forms.

Frequently, where the spacing between a water closet and a lavatory will not permit the rotation of a second arm, the single arm seat can be used. The arm may be placed on either the right or the left side of the seat as required. There are occasions when a seat having a single arm may be desirable, such as with wheel chair patients who must shift their bodies from a wheel chair to the water closet seat. The single arm will help such patients in moving and also help them to maintain an upright position while on the water closet seat.

While in the above several forms of the invention have been disclosed, it will be understood that the specific constructions illustrated and described are merely by way of example and the invention may take other forms within the scope of the appended claims.

What is claimed is:

1. An arm and seat assembly comprising, a seat, an arm at one side of the seat having an inturned end positioned adjacent the back of the seat, mounting means carried by the seat, means pivotally mounting the seat mounting means and the inturned end of the arm in coaxial relation upon a fixed support, and the arm having its opposite end connected to the underside of the seat and bearing upon the fixed support when the seat is lowered, whereby the arm is carried by and movable with the seat and strains upon the arm are transferred to the fixed support.

2. An arm and seat assembly as claimed in claim 1 wherein, there is a second arm at the opposite side of the seat having an inturned end positioned adjacent the back of the seat in coaxial alignment with the seat mounting means and the inturned end of the first-mentioned arm, mounted by the means pivotally mounting the seat mounting means and the inturned end of the first-mentioned arm, and the second arm having its opposite end connected to the underside of the seat and bearing upon the fixed support when the seat is lowered.

3. An arm and seat assembly as claimed in claim 1 wherein, the arms carry supports against which the seat cover rests when in raised position.

4. An arm and seat assembly comprising, a seat, an arm at one side of the seat, a mounting member for the seat and arm having means forming a bearing at each end, the arm having a pivot end rotatably mounted in the bearing-forming means at the end adjacent the arm and the other end attached to the seat, and a pivot rod connected to the seat intermediate the bearing-forming means and mounted within the pivot end of the arm coaxially therewith.

5. An arm and seat assembly as claimed in claim 4 wherein, the pivot end of the arm is tubular, the pivot rod extends into the tubular end, and there is a bushing in the tubular end of the arm having a central opening in which the pivot rod is mounted.

6. An arm and seat assembly as claimed in claim 5 wherein, there are means on the pivot end of the arm to prevent axial movement of the pivot end relative to the seat mounting means, and means on the pivot rod to prevent axial movement of the pivot rod relative to the pivot end of the arm.

7. An arm and seat assembly comprising, a seat, arms at each side of the seat, a mounting member for the seat and arms and having means forming a bearing at each end, the arms having pivot ends rotatably mounted in the bearing-forming means and ends attached to the seat, and a pivot rod connected to the seat intermediate the pivot ends of the arms and mounted within the pivot ends of the arms coaxially therewith.

8. An arm and seat assembly as claimed in claim 7 wherein, the pivot ends of the arms are tubular, the pivot rod is longer than the spacing between the pivot ends of the arms and extends into the tubular ends, and there are bushings in the tubular ends of the arms having central openings in which the pivot rod is mounted.

9. An arm and seat assembly as claimed in claim 8 wherein, there are means on the pivot ends of the arms to prevent axial movement of the pivot ends relative to the seat mounting means, and means on the pivot rod to prevent axial movement of the pivot rod relative to the pivot ends of the arms.

10. An arm and seat assembly as claimed in claim 9 wherein, there are hand grips on the arms fixed against movement on the arms.

11. An arm and seat assembly as claimed in claim 10 wherein, there is a seat cover hingedly connected to the pivot rod to overlie the seat when the seat is in horizontal position.

12. An arm and seat assembly as claimed in claim 10 wherein, each arm has a member to support the cover when in raised position extending rearwardly and inwardly relative to the seat and terminating in a vertical plane rearwardly of the longitudinal axis of the pivot rod.

References Cited

UNITED STATES PATENTS

| | | | |
|---|---|---|---|
| 2,122,687 | 7/1938 | Herrmann | 4—213 |
| 2,358,265 | 9/1944 | Thomas | 4—254 |
| 2,774,975 | 12/1956 | Frank | 4—254 |

LAVERNE D. GEIGER, *Primary Examiner.*

HAROLD J. GROSS, *Assistant Examiner.*